United States Patent
Schramm

(10) Patent No.: US 11,233,232 B2
(45) Date of Patent: Jan. 25, 2022

(54) INCREASING THE SERVICE LIFE OF SILICON-BASED NEGATIVE ELECTRODES BY PARTICLES WITH A SILICON OXIDE AND LIPON COATING

(71) Applicant: Volkswagen Aktiengesellschaft, Wolfsburg (DE)

(72) Inventor: Linda-Susann Schramm, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 162 days.

(21) Appl. No.: 16/158,901

(22) Filed: Oct. 12, 2018

(65) Prior Publication Data
US 2019/0115593 A1   Apr. 18, 2019

(30) Foreign Application Priority Data
Oct. 13, 2017   (DE) .................. 10 2017 218 388.8

(51) Int. Cl.
| | |
|---|---|
| *H01M 4/485* | (2010.01) |
| *H01M 4/36* | (2006.01) |
| *C01B 33/02* | (2006.01) |
| *H01M 4/62* | (2006.01) |
| *H01M 4/38* | (2006.01) |
| *H01M 4/48* | (2010.01) |
| *H01M 10/0525* | (2010.01) |
| *H01M 4/02* | (2006.01) |

(52) U.S. Cl.
CPC ............ *H01M 4/366* (2013.01); *C01B 33/02* (2013.01); *H01M 4/386* (2013.01); *H01M 4/483* (2013.01); *H01M 4/485* (2013.01); *H01M 4/62* (2013.01); *H01M 4/628* (2013.01); *H01M 10/0525* (2013.01); *C01P 2004/64* (2013.01); *H01M 2004/027* (2013.01)

(58) Field of Classification Search
CPC ........ H01M 4/366; H01M 4/386; C01B 33/02
See application file for complete search history.

(56) References Cited

U.S. PATENT DOCUMENTS

| | | |
|---|---|---|
| 9,325,001 B2 | 4/2016 | Miki |
| 9,570,748 B2 | 2/2017 | Dudney et al. |

(Continued)

FOREIGN PATENT DOCUMENTS

| | | |
|---|---|---|
| CN | 101076914 A | 11/2007 |
| CN | 103238238 A | 8/2013 |

(Continued)

OTHER PUBLICATIONS

Park et al., KR 20170015634 A, English Machine Translation, pp. 1-16. (Year: 2017).*

(Continued)

*Primary Examiner* — Tae-Sik Kang
(74) *Attorney, Agent, or Firm* — Pearl Cohen Zedek Latzer Baratz LLP

(57) ABSTRACT

The present invention relates to silicon-based active material for negative electrodes, in particular electrodes with increased service life, in particular for use in batteries, a method for their manufacture, and negative electrodes, batteries, and devices that contain this silicon-based active material.

10 Claims, 3 Drawing Sheets

(56) References Cited

U.S. PATENT DOCUMENTS

| | | |
|---|---|---|
| 2012/0100438 A1 | 4/2012 | Fasching et al. |
| 2012/0196186 A1 | 8/2012 | Richard |
| 2014/0057179 A1 | 2/2014 | Yushin et al. |
| 2015/0056507 A1 | 2/2015 | Dadheech et al. |
| 2015/0221936 A1* | 8/2015 | Huang ............... H01M 4/386 429/217 |
| 2016/0028103 A1 | 1/2016 | Yokoyama et al. |
| 2016/0035910 A1 | 2/2016 | Wu et al. |
| 2016/0233539 A1 | 8/2016 | Sastry et al. |
| 2016/0351973 A1 | 12/2016 | Albano et al. |

FOREIGN PATENT DOCUMENTS

| | | |
|---|---|---|
| CN | 105304931 A | 2/2016 |
| CN | 105 489 891 A | 4/2016 |
| CN | 105765771 A | 7/2016 |
| CN | 106 816 594 A | 6/2017 |
| DE | 10 2014 207 882 A1 | 10/2015 |
| JP | 2008-004460 A | 1/2008 |
| JP | 2013-545228 A | 12/2013 |
| JP | 2014-505340 A | 2/2014 |
| JP | 2015-529960 A | 10/2015 |
| KR | 10-2014-0001905 A | 1/2014 |
| KR | 2017 0015634 A | 2/2017 |
| KR | 20170015634 A * | 2/2017 |
| WO | WO 2012/105009 | 8/2012 |

OTHER PUBLICATIONS

Angew. Chem. Int. Ed. 2008, 47, pp. 1645-1649 (Jan. 21, 2008).
Office Action for Korean Patent Application No. 10-2018-0121491, dated Mar. 29, 2020.
Office Action for Japanese Patent Application No. 2018-193064, dated Oct. 7, 2020.
Search report for German Patent Application No. 10 2017 218 388.8, dated Jul. 31, 2018.
Search report for European Patent Application No. 18199023.5, dated Mar. 28, 2019.
Office Action in Japanese Patent Application No. 2018-193064, dated Nov. 6, 2019.
Office Action for Chinese Patent Application No. 201811195880.7, dated May 27, 2021.

* cited by examiner

INCREASING THE SERVICE LIFE OF SILICON-BASED NEGATIVE ELECTRODES BY PARTICLES WITH A SILICON OXIDE AND LIPON COATING

CROSS-REFERENCE TO RELATED APPLICATIONS

This application claims priority from German Patent Application No. 10 2017 218 388.8, filed Oct. 13, 2017, which is hereby incorporated by reference.

FIELD OF THE INVENTION

The present invention relates to silicon-based active material for negative electrodes, in particular electrodes with increased service life, in particular for use in batteries, a method for their manufacture, and negative electrodes, batteries, and devices that contain this silicon-based active material.

BACKGROUND OF THE INVENTION

Lithium-ion batteries (LIBs) are presently considered as the key technology in electromobility. They must be highly optimized with regard to their cost, weight, energy density, service life, safety, and charge life.

By use of innovative electrode materials it is possible to increase the energy density of lithium-ion batteries (135 Wh/kg (2013) to 280 Wh/kg (2018)), and thus to significantly increase the cruising range of electric vehicles (from 190 km to 500 km). Silicon is a promising active material in this regard. Silicon has a capacity ten times that of commercially used graphite, and has a similarly low lithiation potential (0.5 V vs. lithium-lithium$^+$). Since silicon is the second most common material in the earth's crust and thus has low production costs, and the material is safe to handle and is nontoxic, it is attractive from an industrial standpoint.

It is known that during the first cyclings of a battery, a solid electrolyte interface (SEI), i.e., a boundary layer between the negative electrode and the electrolyte, is formed due to reductive decomposition of various electrolyte components such as solvents, additives, and impurities; this solid electrolyte interface is not thermodynamically or electrochemically stable at the voltages achieved.

The formation of the SEI is on the one hand essential for the functionality and the service life of lithium-ion batteries, since in the ideal case it has good ionic conductivity and at the same time has an electrically insulating effect. Due to its kinetically limiting effect, it largely suppresses further decomposition of the electrolyte and counteracts further capacity losses. On the other hand, the SEI protects the structure of the active material from exfoliation, and thus protects the cell from significant capacity losses.

However, during the formation of the SEI, irreversible capacity loss which is attributed to the formation also always occurs.

In the case of commercial graphite electrodes, the irreversible capacity loss due to the SEI formation is very low, at approximately 2 to 5%, in relation to the silicon-containing negative electrodes, at 20 to 80%.

For the silicon-based negative electrodes, which are particularly susceptible to irreversible capacity loss, a distinction must be made between two different types of irreversible capacity loss. In addition to the capacity loss during the initial formation, i.e., an initial capacity loss, capacity loss due to "breathing" during the cycling also occurs.

Therefore, a fundamental challenge to the commercial application of silicon-based negative electrodes is the enormous change in volume, i.e., the breathing, of the material during the lithiation and delithiation processes ($Si_4Li_{15}$: 280%-300%, compared to $LiC_6$: 10-11%). The breathing of the silicon-based negative electrode results in pulverization of the particles, and thus, additional problems. In particular, it has catastrophic effects on the preservation of the electrode architecture, which occur in particular with high surface loading. This causes contact losses within the electrode and between the electrode and the current collector, and is reflected in impairment of the electrical conductivity. In addition, it results in constant fracturing and growth of the SEI. This in turn results in continuous Li ion consumption and increasing internal resistance in the cell, and thus a lower coulombic efficiency (CE) and inadequate cycle stability.

The SEI has a key function for the functionality and for the service life and reliability of the lithium-ion battery. An SEI generated in situ has various disadvantages, including low electrical insulation, poor ionic conductivity, inadequate adhesion of the SEI to the electrode, nonhomogeneous distribution of the SEI and/or individual components of the SEI on the electrode surface, and/or electrochemical instability.

U.S. Pat. No. 9,570,748 B2 discloses a cathode coating of LiPON or variants thereof for protecting the cathode. Also disclosed is a method for manufacturing a positive electrode having a LiPON coating, and a battery having a LiPON coating.

US 2016/0351973 A1 discloses coating of cathode active material and anode active material, and solid electrolytes for reduction of corrosion and improvement of the service life of a battery. Methods for coating are also disclosed.

SUMMARY OF THE INVENTION

The technical object of the present invention is to provide active material for electrodes and batteries that do not have the above-mentioned disadvantages, and that in particular have good electrical insulation, good ionic conductivity, good adhesion of the SEI to the electrode, homogeneous distribution of the SEI and/or individual components of the SEI on the electrode surface, and/or electrochemical stability.

This technical object is achieved by the present invention by providing the teaching of the independent claims.

Accordingly, the present invention achieves the underlying technical object in particular by providing a silicon-based active material for a negative electrode, wherein the active material contains silicon particles having a diameter of 10 to 75 nm, and in particular is present in the form of such silicon particles, wherein the silicon particles have a silicon core that is provided with at least one first coating and at least one second coating, wherein the first coating is a silicon oxide coating and the second coating is a LiPON coating.

Accordingly, the invention provides an active material that contains silicon particles having a core with at least one first coating and at least one second coating, wherein the core is made from silicon, in particular consists of silicon, and wherein the core is partially or completely, in particular completely, enveloped by the first coating, and wherein the second coating is present on this first coating, and in particular partially or completely, in particular completely, envelops this first coating. The silicon particles present in the active material according to the invention are therefore coated at least twice.

The active material of the present invention thus includes silicon particles having a diameter of 10 to 75 nm, wherein each of these silicon particles has a silicon core that is provided with at least one first coating and at least one second coating, wherein the first coating is a silicon oxide coating and the second coating is a LiPON coating.

In particular, in one preferred embodiment the present invention provides a silicon-based active material that is made of the double-coated silicon particles defined above, i.e., is made up solely of such particles.

In another preferred embodiment, it may be provided that the active material of the present invention contains, in addition to the double-coated silicon particles, a further active material, for example graphite. In one particularly preferred embodiment of the present invention, the silicon-based active material for a negative electrode of the present invention contains silicon particles having a diameter of 10 to 75 nm, wherein each of these silicon particles has a silicon core that is provided with at least one first coating and at least one second coating, and wherein the first coating is a silicon oxide coating and the second coating is a LiPON coating, in a quantity of at least 5 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, at least 96 wt %, at least 97 wt %, at least 98 wt %, and in particular at least 99 wt %, based on the silicon-based active material.

In another embodiment, the weight components that add up to 100 wt % of the active material defined above may be formed by some other active material, in particular graphite.

In one preferred embodiment, the silicon-based active material is an active material that contains at least 5 wt %, preferably at least 10 wt %, preferably at least 20 wt %, preferably at least 30 wt %, preferably at least 40 wt %, preferably at least 50 wt %, preferably at least 60 wt %, preferably at least 70 wt %, preferably at least 80 wt %, preferably 100 wt %, silicon, in each case based on the total weight of the active material.

In one particularly preferred embodiment, the silicon-based active material contains silicon and graphite. In one preferred embodiment, the silicon-based active material is therefore an active material which in addition to silicon contains graphite as active material, and wherein the graphite is present in a quantity of at least 5 wt %, preferably at least 10 wt %, preferably at least 20 wt %, preferably at least 30 wt %, preferably at least 40 wt %, preferably at least 50 wt %, preferably at least 60 wt %, preferably at least 70 wt %, preferably at least 80 wt %, graphite, in each case based on the total weight of the active material.

In one particularly preferred embodiment, the quantity of silicon present in the silicon-based active material together with graphite adds up to 100 wt %, based on the total weight of the active material.

An active material of the present invention may surprisingly be advantageously used to construct a particularly long-lasting electrode. The at least two different coatings that are present in the active material according to the invention advantageously optimize the boundary layer that forms between the electrolyte and the electrode. The coatings thus in particular increase the service life of silicon-containing electrodes. The coatings according to the invention therefore represent an artificial SEI, in a manner of speaking, and have the advantage of being particularly thin and flexible. They are provided with ionic conductivity and are electrically insulating, which in particular is better than with conventional SEI components. The coatings have good adhesion to the core, are electrochemically stable, are homogeneously distributed over the core, and are chemically inert with respect to the electrolyte.

In one preferred embodiment of the present invention, the double-coated silicon particles have a diameter of 10 to 70 nm, in particular 10 to 60 nm, in particular 10 to 55 nm, in particular 10 to 50 nm, in particular 10 to 45 nm, in particular 10 to 40 nm, in particular 10 to 35 nm, in particular 20 to 75 nm, in particular 20 to 70 nm, in particular 20 to 60 nm, in particular 20 to 55 nm, in particular 20 to 50 nm, in particular 20 to 45 nm, in particular 20 to 40 nm, in particular 20 to 35 nm, in particular 30 to 75 nm, in particular 30 to 70 nm, in particular 30 to 60 nm, in particular 30 to 55 nm, in particular 30 to 50 nm, in particular 30 to 45 nm, in particular 30 to 40 nm, in particular 35 to 75 nm, in particular 35 to 70 nm, in particular 35 to 60 nm, in particular 35 to 55 nm, in particular 35 to 50 nm, in particular 35 to 45 nm, in particular 35 to 40 nm, in particular 40 to 75 nm, in particular 40 to 70 nm, in particular 40 to 60 nm, in particular 40 to 55 nm, in particular 40 to 50 nm.

In one preferred embodiment of the present invention, the LiPON coating of the particles has a thickness of 0.2 to 5 nm, in particular 0.5 to 5 nm, in particular 1 to 5 nm, in particular 3 to 5 nm, in particular 0.2 to 4 nm, in particular 0.5 to 4 nm, in particular 1 to 4 nm, in particular 2 to 4 nm, in particular 0.2 to 2 nm, in particular 0.5 to 2 nm, in particular 1 to 2 nm, in particular 0.2 to 1 nm, in particular 0.5 to 1 nm.

In one preferred embodiment of the present invention, the silicon oxide coating of the particles has a thickness of 0.5 to 3 nm, in particular 0.5 to 2 nm, in particular 0.5 to 1 nm, in particular 1 to 3 nm, in particular 1 to 2 nm, in particular 2 to 3 nm.

In one particularly preferred embodiment, the diameter of the double-coated silicon particles is the sum of the diameter of the core of the particles and the layer thickness of the first and second coatings.

In one particularly preferred embodiment, the size of the particles is determined by transmission electron microscopy (TEM).

In one particularly preferred embodiment of the present invention, the silicon oxide coating is made of silicon dioxide and silicon monoxide, in particular silicon monoxide.

In one particularly preferred embodiment of the present invention, the silicon oxide coating is made of silicon dioxide.

The present invention further relates, among other things, to a method for producing a silicon-based active material according to the invention for a negative electrode, wherein the method comprises the following method steps:
  a) Providing silicon oxide-coated silicon particles having a diameter of 9 to 70 nm,
  b) Coating the silicon particles provided in method step a), previously coated with silicon oxide, with LiPON by the atomic layer deposition (ALD) process to obtain at least one second coating, and
  c) Obtaining silicon particles having a diameter of 10 to 75 nm, at least one silicon oxide coating, and at least one LiPON coating.

In one particularly preferred embodiment of the invention, in the method for producing the silicon-based active material, silicon particles coated with silicon monoxide, silicon dioxide, and/or both are provided. In one particularly preferred embodiment of the present invention, the at least one first coating is made up of 2, 3, or more coatings of silicon oxide, wherein these multiple first coatings may be silicon monoxide and silicon dioxide coatings in alternation.

In one particularly preferred embodiment of the present invention, the at least one first coating is made up of a, in particular a single, silicon oxide coating.

In one particularly preferred embodiment of the invention, in the method for producing the silicon-based active material, silicon particles coated with silicon monoxide are provided.

In one particularly preferred embodiment of the invention, in the method for producing the silicon-based active material, silicon particles coated with silicon dioxide are provided.

A further aspect of the present invention relates to the use of silicon-based active material according to the invention as a component of electrode material, in particular electrodes.

The present invention further relates to a silicon-based electrode material that contains the silicon-based active material of the present invention, optionally together with a binder and optionally further substances, for example conductive additives.

The present invention further relates, among other things, to a method for manufacturing silicon-based negative electrodes, wherein the method comprises the following method steps:

d) Providing active material according to the invention,
e) Mixing the active material provided in method step d) with binder and optionally further components to obtain an electrode material,
f) Coating at least one electron-conducting electrode support with the electrode material obtained in method step e), and
g) Obtaining the silicon-based negative electrode.

The present invention further relates to silicon-based negative electrodes. In one particularly preferred embodiment, these are manufacturable, in particular manufactured, according to one of the methods according to the invention.

In one particularly preferred embodiment, the silicon-based negative electrode includes active material according to the invention and a binder and optionally further substances such as conductive additives, and is preferably made of same.

In one preferred embodiment, the silicon-based negative electrode is a silicon-based negative composite electrode.

In one preferred embodiment, the silicon-based negative electrode is an electrode containing at least 5 wt %, preferably at least 10 wt %, preferably at least 20 wt %, preferably at least 30 wt %, preferably at least 40 wt %, preferably at least 50 wt %, preferably at least 60 wt %, preferably at least 70 wt %, preferably at least 80 wt %, silicon, in each case based on the total weight of the electrode material.

In one preferred embodiment, the silicon-based negative electrode is an electrode which in addition to silicon contains graphite as active material, and wherein the graphite is present in a quantity of at least 5 wt %, preferably at least 10 wt %, preferably at least 20 wt %, preferably at least 30 wt %, preferably at least 40 wt %, preferably at least 50 wt %, preferably at least 60 wt %, preferably at least 70 wt %, preferably at least 80 wt %, graphite, in each case based on the total weight of the electrode material.

In one particularly preferred embodiment, the quantity of silicon present in the silicon-based negative electrode together with graphite adds up to 100 wt % of the active material present in the electrode, based on the total weight of the electrode material.

In one particularly preferred embodiment, the quantity of silicon present in the silicon-based negative electrode together with graphite adds up to 100 wt % of the active material present in the electrode, based on the total weight of the electrode material.

In one particularly preferred embodiment, in addition to the active material the electrode material of the silicon-based negative electrode contains binder, preferably in a quantity of at least 1 wt %, preferably at least 2 wt %, preferably at least 3 wt %, preferably at least 4 wt %, preferably at least 5 wt %, preferably at least 6 wt %, preferably at least 7 wt %, preferably at least 8 wt %, preferably at least 9 wt %, preferably at least 10 wt %, preferably at least 12 wt %, preferably at least 15 wt %, preferably at least 20 wt %, in each case based on the total weight of the electrode material.

In particular, the present invention further relates to a half cell, a full cell, and a battery, in particular a lithium-ion battery, containing at least one cell, and having at least one electrode according to the invention, in particular an electrode that includes the silicon-based negative electrode according to the invention.

In one particularly preferred embodiment, the batteries include pouch cells, button cells, or prismatic cells.

In one particularly preferred embodiment, the present invention further relates to devices containing at least one electrode according to the invention, in particular at least one battery according to the invention, in particular robots or electric vehicles, for example electrically driven automobiles, hybrid vehicles, or e-bikes, or electric aircraft such as drones or satellites, electrically operated watercraft such as recreational craft, underwater vehicles, or model ships, or portable devices such as lamps, or communication and/or entertainment devices such as telephones, smart phones, laptops, notebooks, and tablets.

According to the invention, the term "lithium-ion battery" is understood to mean a primary or also a secondary lithium-ion battery, preferably a secondary lithium-ion battery. A primary lithium-ion battery is a nonrechargeable lithium-ion battery, and a secondary lithium-ion battery is a rechargeable lithium-ion battery.

According to the invention, the term "C-rate" is understood to mean the relative charging current or discharging current, based on the theoretical specific capacity of the at least one silicon-based negative electrode. A charging current of C/5, for example, means that a galvanic cell having a capacity of 1 Ah is charged at 1/5 A.

In conjunction with the present invention, a "positive electrode" is understood to mean the electrode that functions as a cathode (electron acceptor) during discharging and as an anode (electron donor) during charging, and the "negative electrode" is understood to mean the electrode that functions as an anode during discharging and as a cathode during charging.

In conjunction with the present invention, a "silicon-based negative electrode" is understood to mean a structure that is suitable as an electrode and that includes an electrode material, in particular active material, which preferably includes silicon or is made of same, situated on an electron-conducting electrode support.

In conjunction with the present invention, the "electrode material" is understood to mean the material that coats the electron-conducting electrode support of an electrode, and in particular that may be composed of active material, binder, and optionally further substances such as conductive additives.

In conjunction with the present invention, the term "binder" is understood to mean a single binder or a mixture of various binders as binder components; in particular, the binder contains various binder components and optionally further additives.

In conjunction with the present invention, an "active material" of an electrode is understood to mean the material used to receive or discharge lithium ions, in particular a lithium metal mixed oxide or lithium iron phosphate in the case of a positive electrode, or in particular silicon, graphite, or both in the case of a negative electrode.

In conjunction with the present invention, the term "first coating" is understood to mean a coating that lies directly on the core of the particle, i.e., the uncoated silicon particle, in particular partially or completely, in particular completely, enveloping same. In one preferred embodiment of the present invention, more than one first coating, in particular 2, 3, 4, 5, 6 or more first coatings, may also be present, i.e., more than one silicon oxide coating may be present, wherein the individual silicon oxide coatings differ from one another by one or more parameters.

In conjunction with the present invention, the term "second coating" is understood to mean a coating that lies on the first coating, in particular partially or completely, in particular completely, enveloping same. In one particularly preferred embodiment of the present invention, more than one second coating, in particular 2, 3, 4, 5, 6 or more second coatings, may also be present, i.e., more than one LiPON coating may be present, wherein the individual LiPON coatings differ from one another by one or more parameters.

In conjunction with the present invention, a core of a silicon particle according to the invention is understood to mean the uncoated silicon particle which together with the at least one first coating and the at least one second coating represents a silicon particle according to the invention of the active material provided according to the invention.

In conjunction with the present invention, "atomic layer deposition" is understood to mean a method for depositing thin coatings on surfaces, wherein a chemical reaction takes place on the surface to be coated, and a thin layer of atoms/molecules is deposited on the surface. For this purpose, at least two starting materials of a chemical reaction, separated from one another by purge sequences, are sequentially transferred to a surface. This cycle may be repeated to obtain a coating made of multiple layers and having different thicknesses.

Further advantageous embodiments result from the subclaims.

BRIEF DESCRIPTION OF THE DRAWINGS

The invention is explained in greater detail with reference to the following figures and the example.

The figures show the following.

DETAILED DESCRIPTION OF THE INVENTION

EXAMPLE

Figure 1:
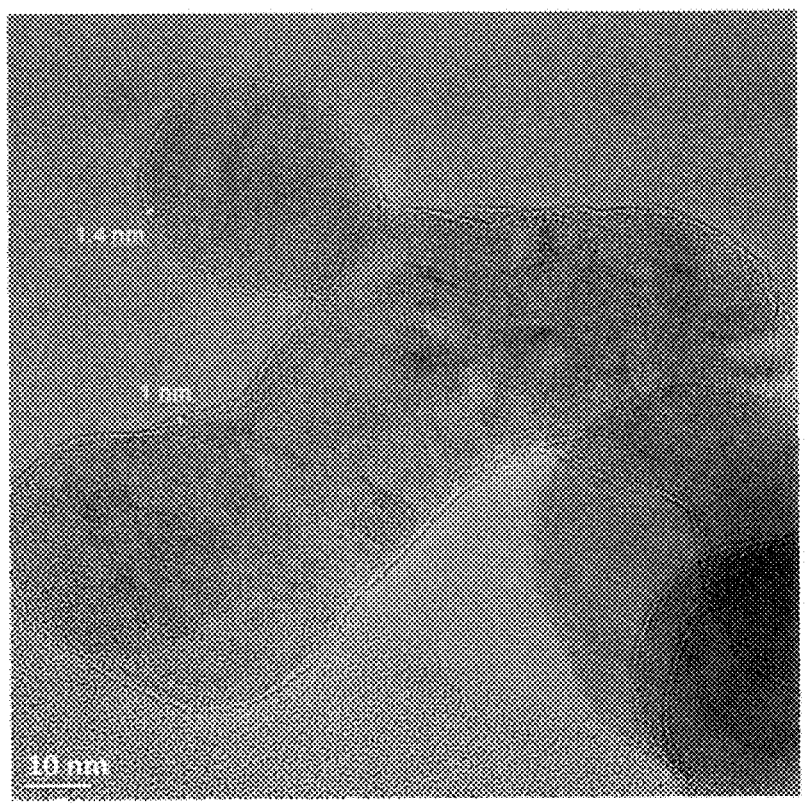
FIG. 1 shows a TEM image of the raw material with an $SiO_2$ layer having a thickness of approximately 1 nm.
Figure 2:
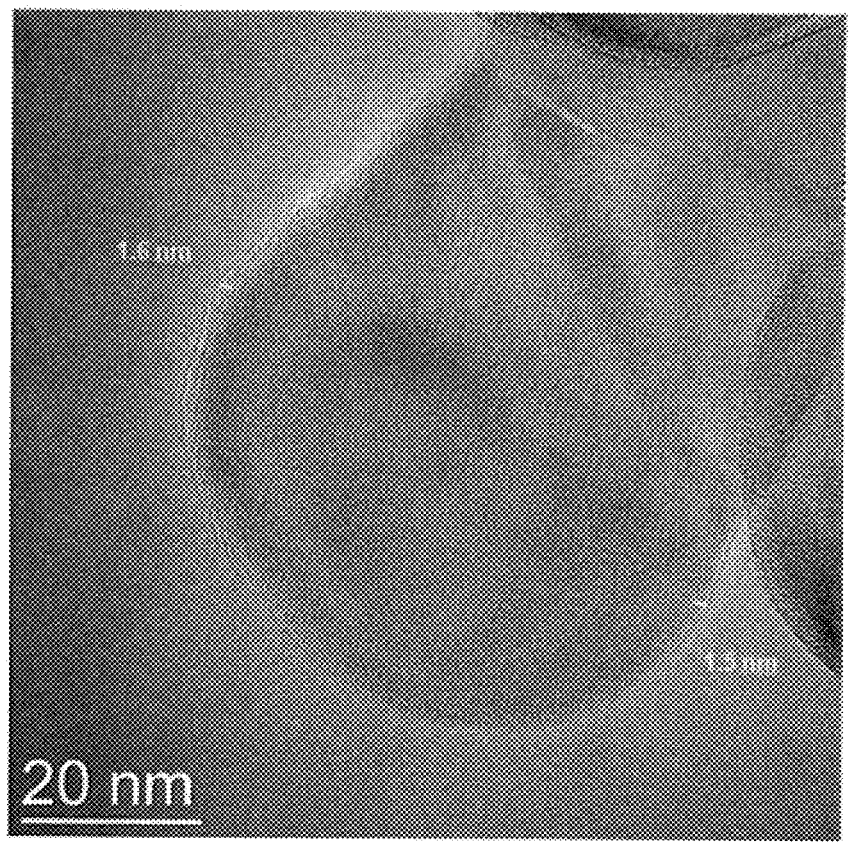
FIG. 2 shows a TEM image of the particles coated with LiPON.

A) Silicon particles having a diameter of 30 to 50 nm were provided with a silicon dioxide coating 1 nm thick. The silicon particles were subsequently coated with a LiPON layer 0.5 nm thick by an atomic layer deposition process. The result of the method, the coated silicon particles, is illustrated in FIG. 2. The 0.5-nm LiPON coating was confirmed, assuming that the existing $SiO_2$ layer was approximately 1 nm thick.

B) The silicon particles coated according to A) were used for manufacturing electrodes having the following formulation:

20 wt % of the double-coated silicon particles obtained according to A);
60 wt % graphite (Imerys—C-NERGY™ SFG6)
12 wt % Imerys—C-NERGY™ SUPER C65
8 wt % binder (1:1:1 carboxymethyl cellulose (700,000 g/mol): poly(acrylic acid) (450,000 g/mol): poly(acrylic acid-co-maleic acid) (350 g/mol).

These solids, with the exception of the binder, were initially mixed in dissolver with tungsten carbide beads (electrode support, 1 mm diameter), and subsequently diluted by adding the binder in two steps, and the viscosity was adjusted, wherein the obtained paste had a pH of 3.

The finished negative electrode was installed in a button cell containing electrolyte (LP 71+10 wt % FEC), and measured with a surface charge of approximately 4.0 mAh/$cm^2$ (corresponding to C/3). The voltage window was 25 mV to 0.9 V.

During the lithiation, a constant current, constant voltage (CCCV) measurement having the following C-rates was used:

During CC: C/3, and during CV: C/20. In contrast, during the delithiation a CC measurement with a C-rate of C/3 was used.

Figure 3:
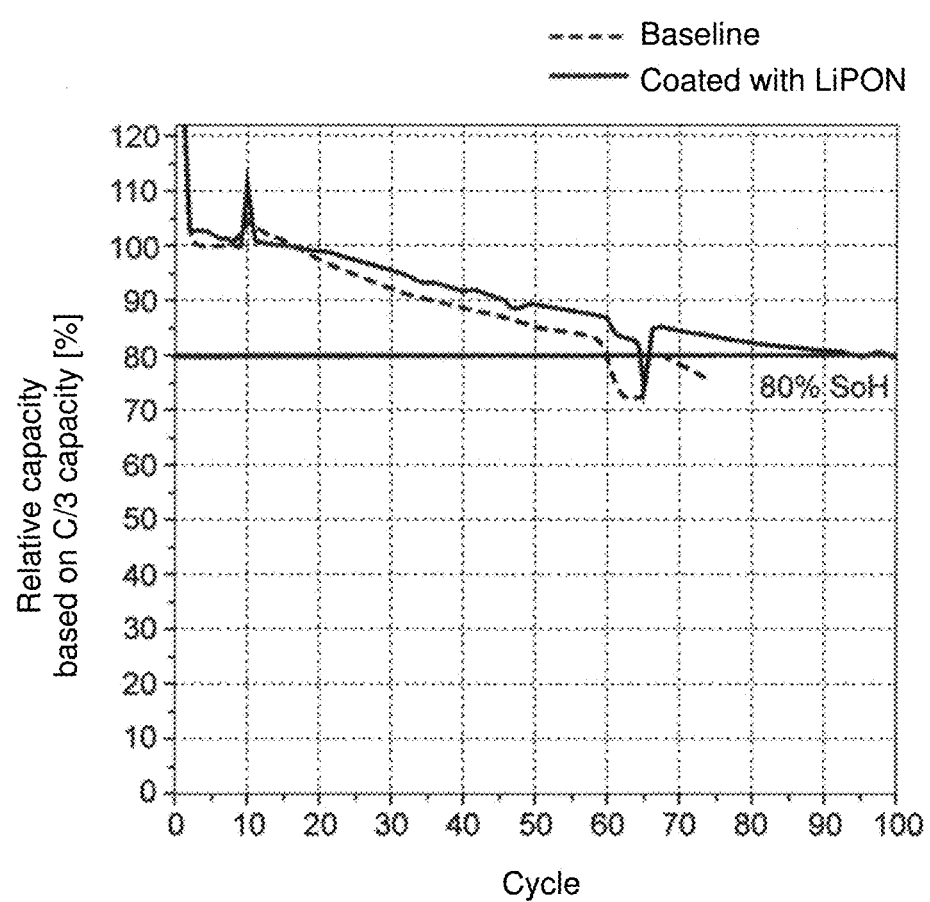
FIG. 3 shows the relative capacity based on the first C/3 capacity, after conclusion of the formation of a battery having a negative electrode containing 20 wt % silicon particles according to the invention, and a battery having a negative electrode containing 20 wt % uncoated silicon particles (standard button cell).

Based on FIG. 3, it is apparent that the button cell having a negative electrode according to the invention has a relative capacity of greater than 80% of its starting capacity over multiple cycles, compared to a standard button cell (instead of silicon particles according to the invention, uncoated silicon particles were used to produce the negative electrode of the button cell). While the button cell having the negative electrode according to the invention does not have a relative capacity of less than 80% until approximately 95 cycles, the relative capacity of the standard button cell has already fallen to below 80% of the starting capacity at 60 to 70 cycles.

The invention claimed is:

1. A silicon-based active material for a negative electrode, comprising:
    silicon particles having a diameter of 10 to 75 nm, wherein the silicon particles have a silicon core that is provided with at least one first coating and at least one second coating, wherein the at least one first coating is a silicon oxide coating and the at least one second coating is a LiPON coating.

2. The silicon-based active material according to claim 1, wherein the silicon particles have a diameter of 30 to 50 nm.

3. The silicon-based active material according to claim 1, wherein the LiPON coating of the silicon particles has a layer thickness of 0.2 to 5 nm.

4. The silicon-based active material according to claim 3, wherein the LiPON coating of the silicon particles has a layer thickness of 0.5 to 1 nm.

5. The silicon-based active material according to claim 1, wherein the silicon oxide coating of the silicon particles has a layer thickness of 0.5 to 3 nm.

6. The silicon-based active material according to claims 1, wherein the silicon oxide is silicon monoxide or silicon dioxide.

7. A silicon-based electrode material that contains the silicon-based active material according to claim 1.

8. A silicon-based negative electrode that contains the silicon-based active material according to claim 1.

9. A lithium-ion battery comprising at least one silicon-based negative electrode according to claim 8.

10. A device comprising at least one lithium-ion battery according to claim 9.

\* \* \* \* \*